(12) United States Patent
Konersmann

(10) Patent No.: US 9,501,517 B2
(45) Date of Patent: Nov. 22, 2016

(54) PROVIDING CONSISTENT TENANT EXPERIENCES FOR MULTI-TENANT DATABASES

(71) Applicant: Microsoft Technology Licensing, LLC, Redmond, WA (US)

(72) Inventor: Scott Anthony Konersmann, Monroe, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/952,890

(22) Filed: Nov. 25, 2015

(65) Prior Publication Data
US 2016/0078082 A1    Mar. 17, 2016

Related U.S. Application Data

(63) Continuation of application No. 14/144,412, filed on Dec. 30, 2013, now Pat. No. 9,229,996.

(51) Int. Cl.
*G06F 17/30* (2006.01)
*H04L 29/08* (2006.01)
*G06F 9/50* (2006.01)

(52) U.S. Cl.
CPC ....... *G06F 17/30377* (2013.01); *G06F 9/5083* (2013.01); *G06F 17/30292* (2013.01); *G06F 17/30563* (2013.01); *H04L 67/1097* (2013.01); *G06F 2209/504* (2013.01)

(58) Field of Classification Search
CPC ............. G06F 17/30292; G06F 17/30; G06F 17/30563; G06F 17/30377

(Continued)

(56) References Cited

U.S. PATENT DOCUMENTS 8,468,251 B1    6/2013 Pijewski et al.
2009/0171885 A1    7/2009 Silberstein et al.
(Continued)

OTHER PUBLICATIONS

"International Search Report & Written Opinion Issued in PCT Patent Application No. PCT/US2014/071778", Mailed Date: Mar. 24, 2015, 10 pages.

(Continued)

*Primary Examiner* — Isaac M Woo
(74) *Attorney, Agent, or Firm* — Aneesh Mehta; Kate Drakos; Micky Minhas

(57) ABSTRACT

The present invention extends to methods, systems, and computer program products for providing consistent tenant experiences at multi-tenant database. Embodiments of the invention include an import service that facilitates data imports without any distribution logic on a tenant. A tenant (caller) provides data in essentially any order. The import service understands the distribution of data across multiple databases and determines for any given piece of import data what database the import data is to be inserted into. Accordingly, the tenant (caller) is relieved from having to know how the data is distributed across a set (of potentially hundreds or thousands) of databases. The import service can optimize an import process to provide load balancing and fairness across a dynamic distributed database system. For example, the import service can insure that a large import by one tenant does not deprive the import other tenants of appropriate resources.

20 Claims, 6 Drawing Sheets

(58) Field of Classification Search
USPC .................................................. 707/600–899
See application file for complete search history.

(56) References Cited

U.S. PATENT DOCUMENTS

| | | | |
|---|---|---|---|
| 2010/0114826 A1 | 5/2010 | Voutilainen et al. | |
| 2012/0109888 A1 | 5/2012 | Zhang et al. | |
| 2012/0109892 A1 | 5/2012 | Novik et al. | |
| 2012/0109926 A1 | 5/2012 | Novik et al. | |
| 2013/0031136 A1 | 1/2013 | Shah | |
| 2013/0132403 A1 | 5/2013 | Liu et al. | |
| 2015/0186479 A1* | 7/2015 | Konersmann | H04L 67/1097 707/809 |

OTHER PUBLICATIONS

"Bulk Import and Export of Data (SOL Server)", Retrieved From <<https://technet.microsoft.com/en-us/library/ms175937.aspx>>, Apr. 27, 2012, 5 Pages.

"Database Sharding—Scaling Data in a Multi Tenant Environment", Retrieved From<<http://blog.techcello.com/2012/07/database-sharding-scaling-data-in-a-multi-tenant-environment/>>, Sep. 24, 2012, 8 Pages.

"SOL Azure Federation Data Migration Wizard", Retrieved From<<https://sqlazuremw.codeplex.com/>> Jan. 24, 2012, 2 Pages.

"Moving to Multi-Tenant Database Model Made Easy with SOL Azure Federations", Retrieved From <<https://blogs.msdn.microsoft.com/cbiyikoglu/2011/03/23/moving-to-multi-tenant-database-model-made-easy-with-sql-azure-federations/>>, Mar. 23, 2011, 3 Pages.

Notice of Allowance Received in U.S. Appl. No. 14/144,412, Mailed Date: Sep. 10, 2015, 9 Pages.

International Preliminary Report on Patentability Issued in PCT Application No. PCT/US2014/071778, Mailed Date: Apr. 4, 2016, 8 Pages.

Second Written Opinion Issued in PCT Application No. PCT/US2014/071778, Mailed Date: Nov. 24, 2015, 8 Pages.

* cited by examiner

;# PROVIDING CONSISTENT TENANT EXPERIENCES FOR MULTI-TENANT DATABASES

CROSS-REFERENCE TO RELATED APPLICATIONS

This application is a continuation of and claims the benefit of and priority to U.S. patent application Ser. No. 14/144,412, entitled "Providing Consistent Tenant Experiences For Multi-Tenant Databases", filed Dec. 20, 2013 by Scott Anthony Konersmann, the entire contents of which are expressly incorporated by reference.

BACKGROUND

Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks is distributed across a number of different computer systems and/or a number of different computing environments.

In database environments, users can use tools and algorithms to load data into databases. These tools normally only work on a single table (or at best database) at a time. However, as databases become larger, there is a need to split data across many databases to handle the scale. When data is split, users are forced to perform various manual actions and/or write client side code that understands the data distribution. The client code can then be executed to import data. However, each time data is split (or subsequently merged), the client side code has to be rewritten and compiled to adjust for the new distribution. Thus, adjusting for changed distributions can result in considerable work for a user.

Alternately, it is possible to write code so that data distribution can be changed via configuration. However, it takes a configuration change and downtime to update the system.

In many organizations, responsibilities for importing data and splitting databases can belong to different individuals. For example, a database administrator may be responsible for maintaining an appropriate database distribution based on available resources. On the other hand, an application developer may be responsible for maintaining an application that imports data into a database. Lack of communication between the database administrator and application developer can result in non-functioning applications. For example, if the database administrator fails to communicate a new database distribution from splitting a database, a data import application may stop working. Even when the application developer is made aware of the split, it may take some about of time for the application developer to modify the data import application for use with the new data distribution.

In other environments, such as, for example, multi-tenant, multi-database environments, a database administrator may have no control over data distribution. For example, cloud database environments can maintain multiple databases per tenant and can service many tenants. In a cloud database environment, modules within the cloud environment can automatically split and/or merge databases as appropriate. Splitting and/or merging databases can be based on a customer's needs, available resources within the cloud environment, needs of other customer's, etc. As such, an application developer may have no way to know a data distribution for corresponding data. Further, in a cloud environment, data distributions can change with some regularity. Thus, when a database is operated in a cloud environment, it can be extremely difficult for an application developer to maintain a data import application.

Further, when importing data into multi-tenant, multi-database environments, import modules can be configured to import all data for one tenant before moving to import data for another tenant. Thus, tenants with larger data requirements can consume significant resources for extended periods of time. Consumption of significant resources by a single tenant is detrimental to other tenants as well as to the system managing the multi-tenant, multi-database. For example, other tenants can be preventing from importing their data until the import of larger amounts of data for another tenant completes. When a large amount of data is imported to a specified database within a multi-tenant, multi-database environment, resources associated with the specified database can also become overloaded. Tenants have no real motivation to limit import data size, since they simply desire to have their own data imported.

BRIEF SUMMARY

The present invention extends to methods, systems, and computer program products for providing consistent tenant experiences at multi-tenant database. First data is accessed. The first data is associated with a tenant of a dynamic distributed database system. The first data has a plurality of data portions, each having values (e.g., primary key values) within one or more ranges of a database of the tenant. One or more data portions, from among the plurality of data portions, are imported into the dynamic distributed database system.

For each of the one or more data portions, importing includes referring to a global partition map for the dynamic distributed database system to schedule the data portion for insertion into an appropriate database for the tenant. The appropriate database for the tenant is at a node of the dynamic distributed database system.

Second data is accessed. The second data is associated with a second tenant of the dynamic distributed database system. The second data has values (e.g., primary key values) within one or more ranges of a database of the second tenant.

Import of the first data is suspended or throttled subsequent to accessing the second data and prior to completing import of all of the plurality of data portions. Accordingly, one or more data portions, from among the plurality of data portions, remain to be processed.

Subsequent to suspending or throttling import of the first data into the dynamic distributed database system, a portion of the second data is imported into the dynamic distributed database system Importing the portion of second data includes referring to the global partition map to schedule the portion of the second data for insertion into appropriate database for the second tenant. The appropriate database for the second tenant is at a node of the dynamic distributed database system.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1A:
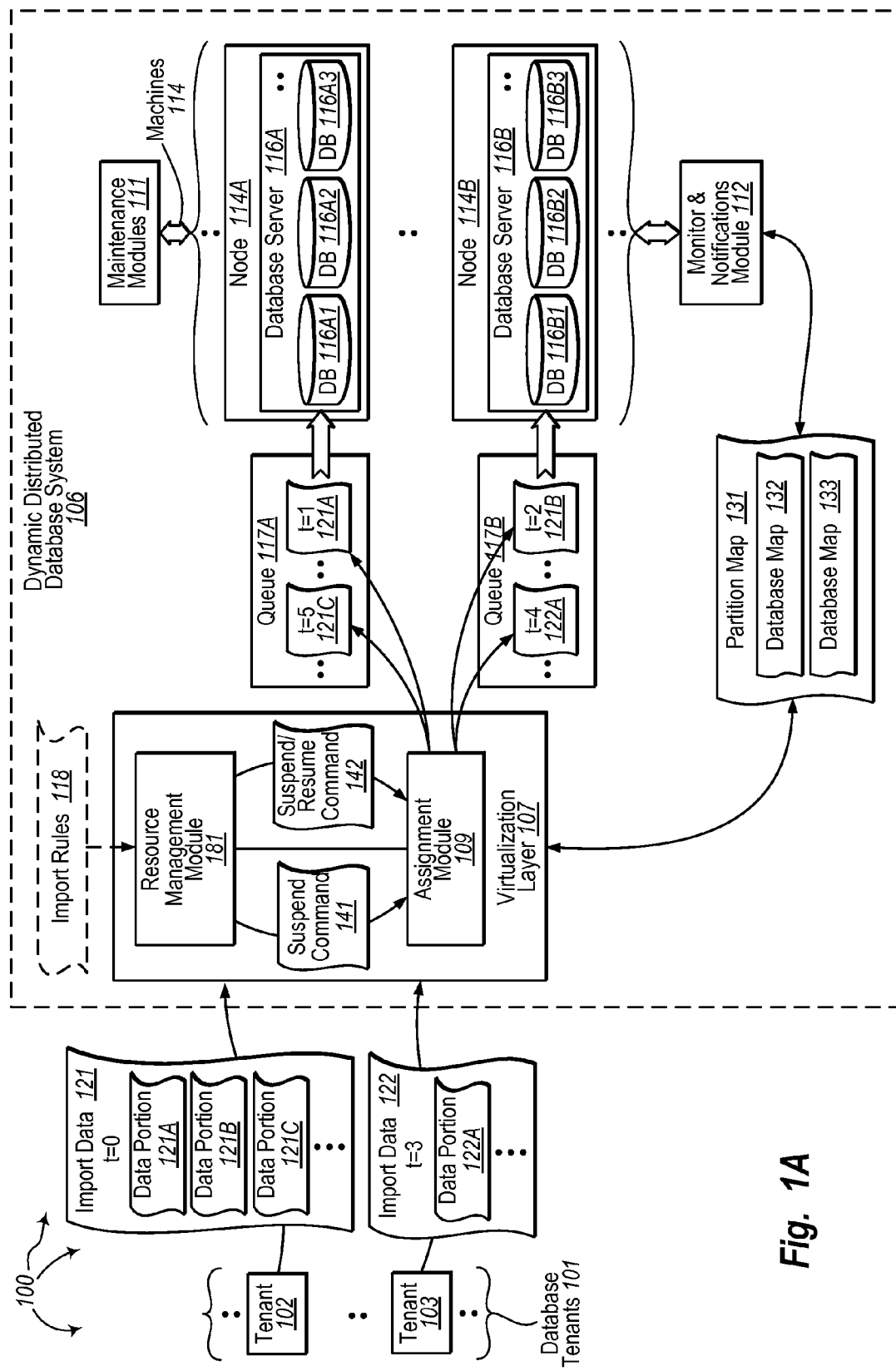
FIG. 1A illustrates an example computer architecture that facilitates providing consistent tenant experiences at multi-tenant databases.

The present invention extends to methods, systems, and computer program products for providing consistent tenant experiences at multi-tenant database. First data is accessed. The first data is associated with a tenant of a dynamic distributed database system. The first data has a plurality of data portions, each having values (e.g., primary key values) within one or more ranges of a database of the tenant. One or more data portions, from among the plurality of data portions, are imported into the dynamic distributed database system.

For each of the one or more data portions, importing includes referring to a global partition map for the dynamic distributed database system to schedule the data portion for insertion into an appropriate database for the tenant. The appropriate database for the tenant is at a node of the dynamic distributed database system.

Second data is accessed. The second data is associated with a second tenant of the dynamic distributed database system. The second data has values (e.g., primary key values) within one or more ranges of a database of the second tenant.

Import of the first data is suspended or throttled subsequent to accessing the second data and prior to completing import of all of the plurality of data portions. Accordingly, one or more data portions, from among the plurality of data portions, remain to be processed.

Subsequent to suspending or throttling import of the first data into the dynamic distributed database system, a portion of the second data is imported into the dynamic distributed database system Importing the portion of second data includes referring to the global partition map to schedule the portion of the second data for insertion into appropriate database for the second tenant. The appropriate database for the second tenant is at a node of the dynamic distributed database system.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, embodiments of the invention can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that computer storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the invention can also be implemented in cloud computing environments. In this description and the following claims, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud computing model can be composed of various characteristics such as, for example, on-demand self-service, broad network access, resource pooling, rapid elasticity, measured service, and so forth. A cloud computing model can also expose various service models, such as, for example, Software as a Service ("SaaS"), Platform as a Service ("PaaS"), and Infrastructure as a Service ("IaaS"). A cloud computing model can also be deployed using different deployment models such as private cloud, community cloud, public cloud, hybrid cloud, and so forth. In this description and in the claims, a "cloud computing environment" is an environment in which cloud computing is employed.

Embodiments of the invention include an import service that facilitates data imports without any distribution logic on a tenant. A tenant (caller) provides data in essentially any order. The import service understands the distribution of data across multiple databases and determines for any given piece of import data what database the import data is to be inserted into. Accordingly, the tenant (caller) is relieved from having to know how the data is distributed across a set (of potentially hundreds or thousands) of databases.

The import service can group sets of data destined for a given database together and can use batch operations to increase efficiency. The import service can understand the way data is allocated across databases (e.g., as a result of online split operations and/or merge operations), how databases area placed on individual nodes (machines), movement of databases between nodes (e.g., for load balancing or servicing), and what other operations are occurring during the import. The import service can use this information to increase import efficiency as well as increase resiliency to failures.

The import service can be aware of multi-tenancy and can optimize an import process to provide load balancing and fairness across a dynamic distributed database system, such as, a cloud database system. The import service can insure that a large import by one tenant does not deprive the import of another tenant of appropriate resources. For example, when an import for one tenant is detected as consuming an amount of resources that might degrade the import experience of one or more other tenants, the import for the one tenant is suspended (stopped) or throttled (slowed down). As such, resources previously allocated for the import can be reallocated for use in importing data for the one or more other tenants. When resource consumption patterns subsequently change or through passage of time, the import can be resumed or throttling can be removed.

FIG. 1A illustrates an example computer architecture 100 that facilitates providing consistent tenant experiences at multi-tenant databases. Referring to FIG. 1A, computer architecture 100 includes database tenants 101 and dynamic distributed database system 106. Each of database tenants 101 and dynamic distributed database system 106 can be connected to one another over (or be part of) a network, such as, for example, a Local Area Network ("LAN"), a Wide Area Network ("WAN"), and even the Internet. Accordingly, each of database tenants 101 and dynamic distributed database system 106 as well as any other connected computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc. or using other non-datagram protocols) over the network.

As depicted, dynamic distributed database system 106 (e.g., a cloud database system) includes virtualization layer 107, maintenance modules 111, monitor and notification module 112, and machines 114. Database tenants 101 include tenants 102 and 103 (vertical ellipses indicate that other tenants before, between, and after tenants 102 and 103 may exist). Each of tenants 102 and 103 can store data in one or more databases managed by dynamic distributed database system 106. In general, virtualization layer 107 abstracts the underlying hardware, data layout, data storage locations, database locations, data movement, database movement, etc., within dynamic distributed database system 106 from database tenants. As such, each database tenant is essentially provided a logical view of a dedicated database.

Figure 1B:
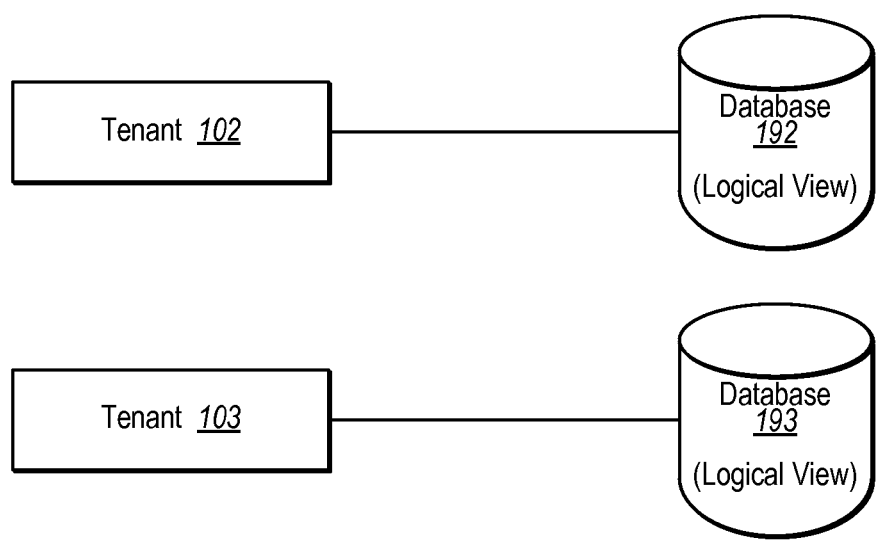
FIG. 1B illustrates an example of logical database views provided to dynamic distributed database tenants.

Turning briefly to FIG. 1B, tenants 102 and 103 can be provided with logical views of databases 192 and 193 respectively (even though data for each tenants 102 and 103 can be stored on and moved between different databases and nodes of dynamic distributed database system 106). Database tenants can interact with a provided logical view as if interacting with a dedicated database. For example, tenants 102 and 103 can interact with logical views of databases 192 and 193 respectively as if interacting with individual dedicated databases. Tenants 102 and 103 can do so even when tens, hundreds, or even thousands of other tenants are also interacting with dynamic distributed database system 106 through other abstracted logical views to store and access data.

Returning to FIG. 1A, machines 114 includes nodes 114A, 114B, etc. (vertical ellipses indicate that other tenants before, between, and after nodes 114A, and 114B may exist). Each machine can include a database server (e.g., a SQL server). For example, nodes 114A, 114B, etc. include database servers 116A, 116B, etc., respectively. Each database server can maintain one or more databases for storing tenant data. For example, database server 116A includes databases 116A1, 116A2, 116A3, etc. Database server 116B includes databases 116B1, 116B2, 116B3, etc. Database servers can maintain virtually any number of databases and the number of databases maintained by different database servers can vary. Further, data ranges for a plurality of different tenants can be stored at a database.

Maintenance modules 111 issue instructions to machines 114 to change underlying hardware, to change data layout, to change data storage locations, to change database locations, to move data, to move databases, etc., For example, maintenance modules 111 can issue instructions to move a data range for a tenant from one database to another database, can issue instructions to merge data ranges for a tenant at a database, can issue instructions to split a data range for a tenant between a plurality of database, can issue instructions to move a database from one node to another node, etc. Maintenance modules 111 can issue instructions in an automated manner and/or can issue instructions in response to instructions from administrators.

From time to time or at specified intervals, maintenance modules 111 can monitor resource usage at nodes included machines 114 can issue instructions to balance resource usage. For example, if one node is experiencing higher resource usage, a portion of the data ranges and/or databases at the node can be moved to another node with lower resource usage. If maintenance modules 111 detect a node or database failure, maintenance modules 111 can issue instructions to move appropriate data ranges and/or databases to other nodes. Maintenance modules 111 can also issue instructions to lock appropriate data ranges and/or databases so that further data is not stored at failing components.

An administrator can also issue commands to maintenance modules 111. For example, an administrator can send commands to take down a specified node. In response, maintenance modules 111 can issue instructions to move databases at the node to one or more other nodes. Likewise, an administrator can flag a newly added node as available. In response, maintenance modules 111 can issue instructions to move databases from one or more other nodes to the newly available node.

Accordingly, underlying hardware, data layout, data storage locations, database locations, etc. of machines 114 can change overtime. In general, partition map 131 maps data ranges to databases and databases to nodes. For example, as depicted, partition map 131 includes data range map 132 and database map 133.

On a per tenant basis, data elements in data range map 132 map data ranges for the tenant to a corresponding databases. For example, data range map 132 includes data ranges to databases mappings for tenants 102, 103, etc. Database map 133 maps databases to corresponding nodes.

In general, monitor and notification module 112 is configured to update partition map 131 as changes at machines 114 are detected. From time to time or at specified intervals, monitor and notification module 112 can poll machines 114 to determine a configuration. In some embodiments, components of machines 114 notify monitor and notification module 112 when a change occurs. For example, a node can notify monitor and notification module 112 when a database is added to or removed from the node. Similarly, a database server can notify monitor and notification module 112 when a data range is added to or removed from a database maintained by the database server.

In response to detected changes and/or notifications, monitor and notification module 112 can update partition map 131 as appropriate to indicate more recent configurations at machines 114. Monitor and notification module 112 can add, delete, change, modify, etc., mappings in data range map 132 and/or database map 133. For example, monitor and notification module 112 can delete one data range to database mapping and add two new data range to database mappings when a data range is split. On the other hand, monitor and notification module 112 can delete two data range to database mappings and add one new data range to database mapping when two data ranges are merged. Monitor and notification module 112 can also remove, add, and modify database to node mappings as movement of database between nodes is detected.

Virtualization layer 107 further includes resource management module 181 and assignment module 109. Assignment module 109 is configured to receive import data from a tenant and move the portions of the import data (e.g., rows) into appropriate queues for storage in a database. Based on a data value (e.g., a primary key value) in a portion of data (e.g., a row) from a tenant, assignment module 109 can refer to a data range map 132 for the tenant. From the data range map 132, assignment module 109 can determine what data range includes the data value. Assignment module 109 can then refer to the corresponding database for that data range. Assignment module 109 can then move the portion of import data to a queue for the node that hosts the corresponding database.

Resource management module 181 is configured to monitor resource consumption patterns for data imports of tenants of dynamic distributed database 106. Monitoring resource consumption patterns for data imports can include, for each tenant, monitoring the aggregate resource consumption for any data imports being performed for the tenant. As such, resource manager module 181 can determine when an amount of resources being consumed for a tenant's imports are potentially degrading the data import experience for other tenants. For example, resource manager module 181 can determine when a particular tenant is hogging bandwidth such that other tenant's data imports are slow or not possible.

Resource management module 181 can include algorithms to calculate aggregate resource consumption for tenants of dynamic distributed database 106. Resource management module 181 can include algorithms for detecting when resource consumption by one tenant is potentially degrading the import experience of one or more other tenants. Resource consumption thresholds can be used to detect when resource consumption by one tenant is potentially degrading the import experience of one or more other tenants. Resource management module 181 can also include algorithms defining actions that can be taken when the resource consumption of one tenant potentially degrades the import experience of one or more other tenants.

In some embodiments, the algorithms of resource management module 181 are supplemented or even supplanted by import policy 118. Import policy 118 can include rules for calculating aggregate resource consumption, rules for detecting when resource consumption by one tenant is potentially degrading the import experience of one or more other tenants, and rules defining actions that can be taken when the resource consumption of one tenant potentially degrades the import experience of one or more other tenants.

Defined actions can include temporarily suspending or throttling import of a first tenant's data until at least some data for one or more other tenants is successfully imported. Import of the first tenant's data can then be resumed. For example, in some embodiments, resource management module 181 suspends data import for a first tenant so that resources are freed up for use in importing data for other tenants. The freed up resources can then be used to import data for other tenants. When data import for other tenants is complete, is detected as degrading the import experience for further tenants, or through the passage of time, import of the first tenant's data can be resumed.

Thus, defined actions can include suspending or throttling import of a tenant's data until it is detected that resources consumed by some other tenant is potentially degrading the import experience of one or more further tenants Import of the tenant's data can then be resumed. For example, in some embodiments, resource management module 181 suspends or throttles data import for a first tenant so that resources are freed up for use in importing data for other tenants. The freed up resources can then be used to import data for other tenants. When it is detected that resource consumption by a second tenant is potentially degrading the import experience of one or more further tenants, import of the first tenant's data can be resumed. Import of the one or more further tenant's data can possibly also continue.

As such, in some embodiments, resource management module 181 balances resource allocation across a plurality of tenants to provide a consistent import experience to each of the plurality of tenants. To provide a consistent import experience, resource management module 181 can suspend/throttle and resume/unthrottle data imports for different tenants from time to time based on calculated resource consumption at each of the plurality of tenants. For example, resource management module 181 can detect that a first tenant is consuming an amount of resources potentially degrading the import experience of one or more other tenants. Concurrently, resource management module 181 can also detect that a second tenant is consuming an amount of resources potentially degrading the import experience of the one or more other tenants. Resource management module 181 can suspend/throttle and resume/unthrottle data imports for the first and second tenants to balance resource allocation between the first tenant, the second tenant, and the one or more other tenants. Suspending/throttling and resuming/unthrottling data imports for the first and second tenants can provide a consistent user experience to the first tenant, the second tenant, and the one or more other tenants.

Various time indicators, for example, t=0, t=1, t=2, etc., are depicted in the data elements of computer architecture 100. The depicted time indicators are used to indicate the order for an occurrence of events relative to one another with computer architecture 100. That is, the time indicators are used to indicate that some events occur before or after other events. Within these time indicators lower numbers are defined to occur before higher numbers. For example, "t=1" occurs before "t=2". Similarly, higher numbers are defined to occur after lower numbers. For example, "t=7" occurs after "t=4". However, it is to be understood that the depicted time indicators do not represent any measured passage of time either before, after, or between the depicted time indicators. That is, no specified time measurements or specific time periods are associated with the time indicators.

Figure 2:
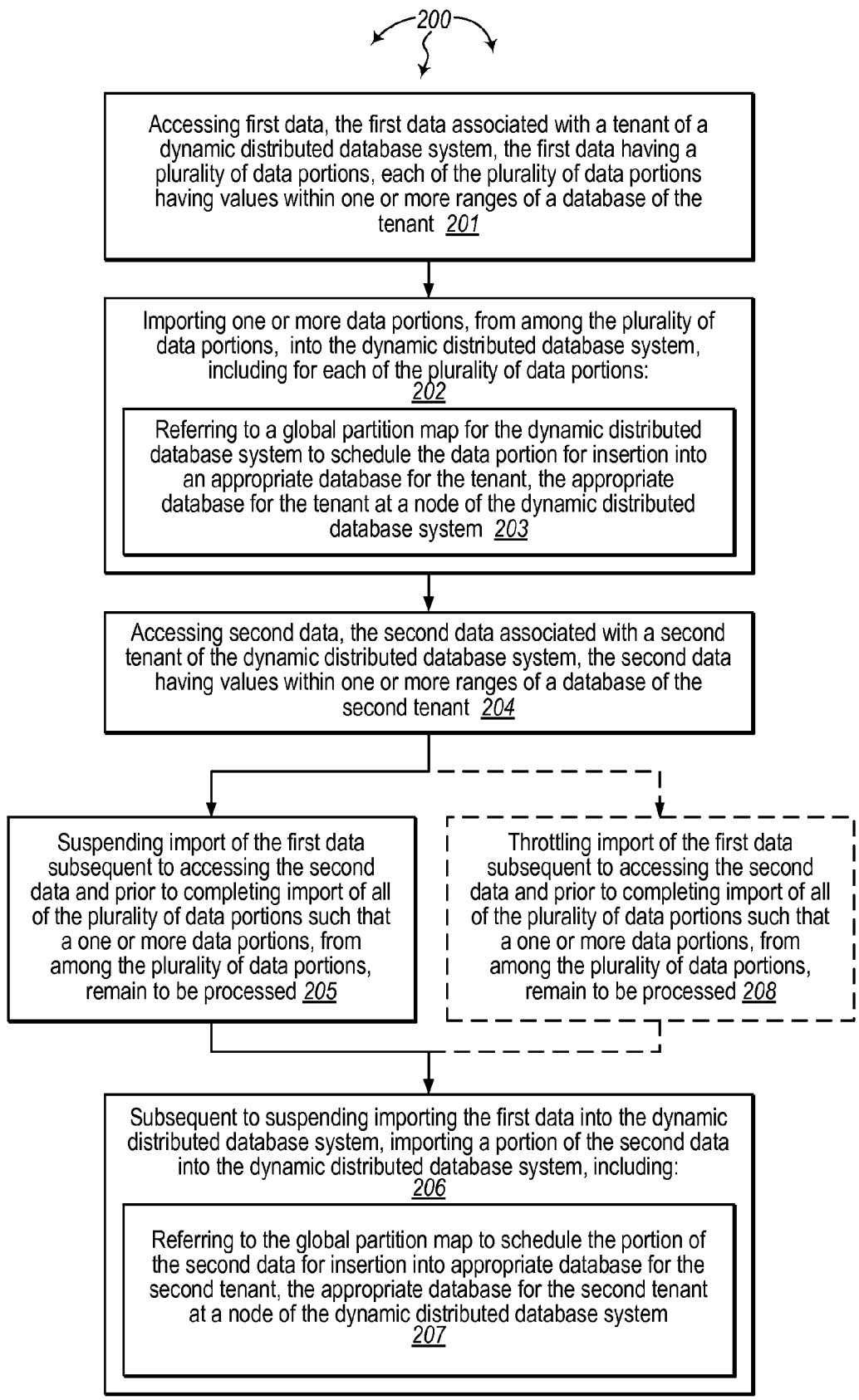
FIG. 2 illustrates a flow chart of an example method for providing consistent tenant experiences at multi-tenant databases.

FIG. 2 illustrates a flow chart of an example method 200 for providing consistent tenant experiences at multi-tenant databases. Method 200 will be described with respect to the components and data of computer architecture 100.

Method 200 includes accessing first data, the first data associated with a tenant of a dynamic distributed database system, the first data having a plurality of data portions, each of the plurality of data portions having values within one or more ranges of a database of the tenant (201). For example, virtualization layer 107 can access import data 121 at t=0. Import data 121 is associated with tenant 102 and includes data portions 121A, 121B, and 121C (e.g., rows of database). Each of data portions 121A, 121B, and 121C have data values, for example, primary key values with in one or more ranges of database for tenant 102.

Method 200 includes importing one or more data portions, from among the plurality of data portions, into the dynamic distributed database system (202). For example, data portions 121A and 121B can be imported into dynamic database system 106.

Importing one or more data portions includes for each of the one or more data portions, referring to a global partition map for the dynamic distributed database system to schedule the data portion for insertion into an appropriate database for the tenant, the appropriate database for the tenant at a node of the dynamic distributed database system (203). For example, assignment module 109 can refer to data range 132 map and database map 133 to determine that data portion 121A is to be inserted into a database at node 114A. Assignment module 109 can schedule data portion 121A into queue 117A at t=1. Similarly, assignment module 109 can refer to data range 132 map and database map 133 to determine that data portion 121B is to be inserted into a database at node 114B. Assignment module 109 can schedule data portion 121B into queue 117B at t=2.

Method 200 includes accessing second data, the second data associated with a second tenant of the dynamic distributed database system, the second data having values within one or more ranges of a database of the second tenant (204). For example, virtualization layer 107 can access import data 122 at t=3 Import data 122 is associated with tenant 103 and includes data portion 122A (e.g., a row of database). Data portion 122A can have a data value, for example, a primary key value, within a range of a database for tenant 103.

Method 200 includes suspending import of the first data subsequent to accessing the second data and prior to completing import of all of the plurality of data portions such that a one or more data portions, from among the plurality of data portions, remain to be processed (205). For example, resource management module 181 can suspend import of import data 121 subsequent to accessing import data 122 and prior to completing import of all of data portions 121A, 121B, 121C, etc. such that data portion 121C and any other data portions in import data 121 remain to be processed.

Resource management module 181 can detect that tenant 102 is consuming an aggregate amount of resources that potential degrades the import experience of tenant 103 (as well as other database tenants). In response, resource management module 181 can send suspend command 141 to assignment module 109 at t=4. Suspend command 141 can instruct assignment module 109 to suspend (i.e., stop) import of import data 121. Assignment module 109 can receive suspend command 141 from resource management module 181. Assignment module 109 can stop importing import data 121 in response to receiving suspend command 141.

Alternately, method 200 includes throttling import of the first data subsequent to accessing the second data and prior to completing import of all of the plurality of data portions such that a one or more data portions, from among the plurality of data portions, remain to be processed (208). For example, resource management module 181 can throttle import of import data 121 subsequent to accessing import data 122 and prior to completing import of all of data portions 121A, 121B, 121C, etc. such that data portion 121C and any other data portions in import data 121 remain to be processed.

As described, resource management module 181 can detect that tenant 102 is consuming an aggregate amount of resources that potential degrades the import experience of tenant 103 (as well as other database tenants). In response, resource management module 181 can send a throttle command to assignment module 109 at t=4. The throttle command can instruct assignment module 109 to throttle (i.e., slow down) import of import data 121. Assignment module 109 can receive throttle command 141 from resource management module 181. Assignment module 109 can throttle (slow down) importing import data 121 in response to receiving the throttle command.

Method 200 includes subsequent to suspending or throttling importing the first data into the dynamic distributed database system, importing a portion of the second data into the dynamic distributed database system (206). For example, subsequent to suspending or throttling import of import data 121, data portions 122A can be imported into dynamic database system 106.

Importing a portion of the second data includes referring to the global partition map to schedule the portion of the second data for insertion into appropriate database for the second tenant, the appropriate database for the second tenant at a node of the dynamic distributed database system (207). For example, assignment module 109 can refer to data range 132 map and database map 133 to determine that data portion 122A is to be inserted into a database at node 114B. Assignment module 109 can schedule data portion 122A into queue 117B at t=5.

Subsequent to importing data portion 122A, and possibly one or more additional portions of data in import data 122, resource management module 181 can detect that import of import data 122 is complete. Alternately, subsequent to importing data portion 122A, and possibly one or more additional portions of data in import data 122, resource management module 181 can detect that tenant 103 is consuming an aggregate amount of resources that potential degrades the import experience of tenant 102 (as well as other database tenants).

In response, resource management module 181 can send suspend/resume command 142 to assignment module 109 at t=6. Suspend/resume command 142 can instruct assignment module 109 to suspend import of import data 122 and resume import of import data 121. Assignment module 109 can receive suspend/resume command 142 from resource management module 181. Assignment module can stop importing import data 122 and resume importing import data 121 in response to receiving suspend/resume command 142.

Alternately, in response, resource management module 181 can send a throttle/resume command to assignment module 109 at t=6. The throttle/resume command can instruct assignment module 109 to throttle import of import data 122 and unthrottle import of import data 121. Assignment module 109 can receive the throttle/resume command from resource management module 181. Assignment module can throttle importing import data 122 and unthrottle importing import data 121 in response to receiving the throttle/resume command 142.

Further portions of import data 121 can then be imported into dynamic database system 106. For example, assignment module 109 can refer to data range 132 map and database map 133 to determine that data portion 121C is to be inserted into a database at node 114A. Assignment module 109 can schedule data portion 121C into queue 117A at t=7.

Threads for queues 117A and 117B can dequeue data and store dequeued data in appropriate databases at nodes 114A and 114B respectively.

Figure 3:
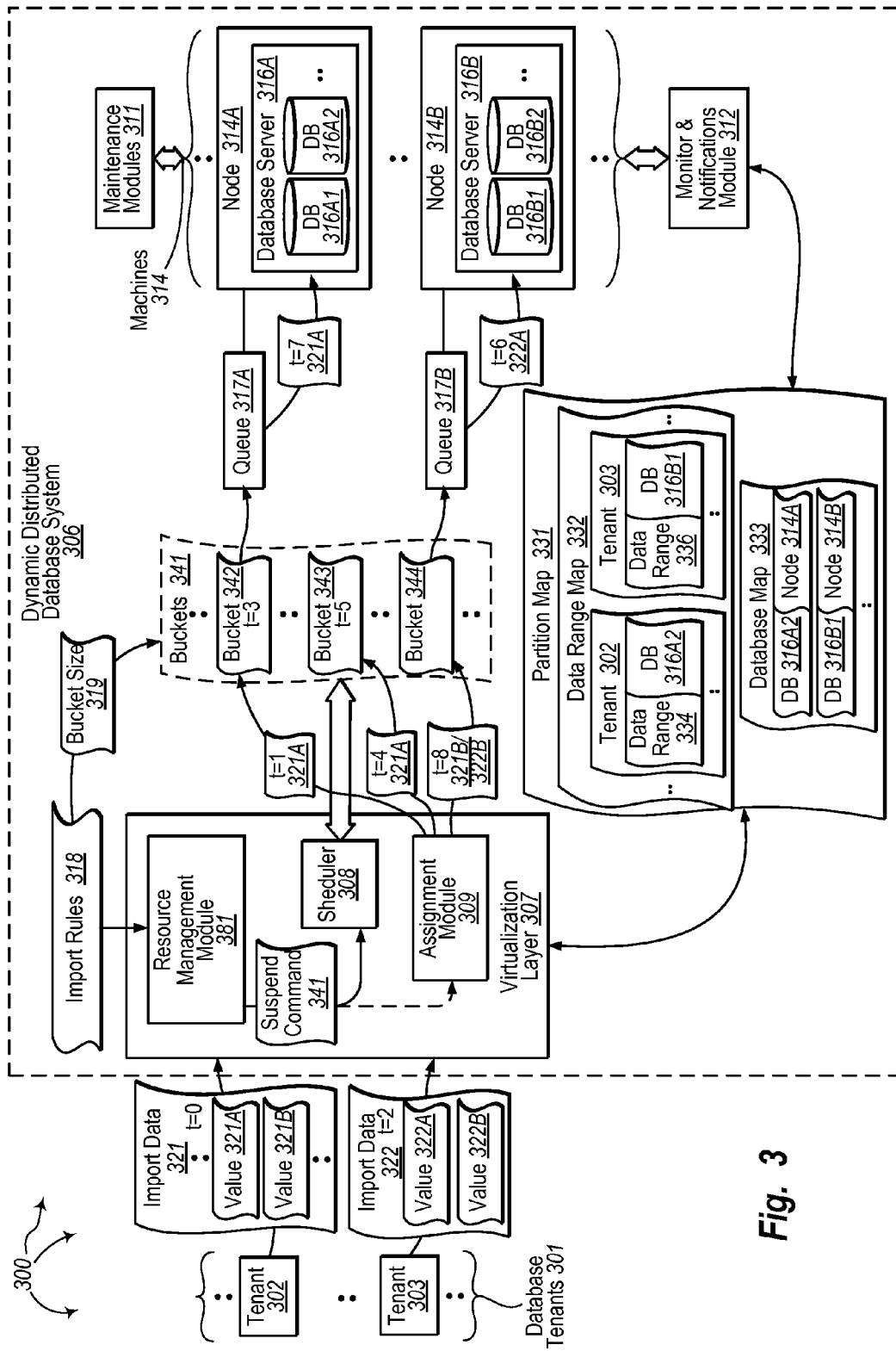
FIG. 3 illustrates another example computer architecture that facilitates providing consistent tenant experiences at multi-tenant databases.

FIG. 3 illustrates an example computer architecture 300 that facilitates providing consistent tenant experiences at multi-tenant databases. Referring to FIG. 1, computer architecture 300 includes database tenants 301 and dynamic distributed database system 306. Each of database tenants 301 and dynamic distributed database system 306 can be connected to one another over (or be part of) a network, such as, for example, a Local Area Network ("LAN"), a Wide Area Network ("WAN"), and even the Internet. Accordingly, each of database tenants 301 and dynamic distributed database system 306 as well as any other connected computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc. or using other non-datagram protocols) over the network.

As depicted, dynamic distributed database system 306 (e.g., a cloud database system) includes virtualization layer 307, maintenance modules 311, monitor and notification module 312, and machines 314. Database tenants 301 include tenants 302 and 303 (vertical ellipses indicate that other tenants before, between, and after tenants 302 and 303 may exist). Each of tenants 302 and 303 can store data in one or more databases managed by dynamic distributed database system 306. Similar to virtualization layer 107, virtualization layer 307 abstracts the underlying hardware, data layout, data storage locations, database locations, data movement, database movement, etc., within dynamic distributed database system 306 from database tenants. As such, each database tenant is essentially provided a logical view of a dedicated database.

Machines 314 include nodes 314A, 314B, etc. (vertical ellipses indicate that other tenants before, between, and after nodes 314A and 314B may exist). Each machine can include a database server (e.g., a SQL server). For example, nodes 314A, 314B, etc. include database servers 316A, 316B, etc., respectively Each database server can maintain one or more databases for storing tenant data. For example, database server 316A includes databases 316A1, 316A2, etc. Database server 316B includes databases 316B1, 316B2, etc. Database servers can maintain virtually any number of databases and the number of databases maintained by different database servers can vary. Further, data ranges for a plurality of different tenants can be stored at a database.

Maintenance modules 311 issue instructions to machines 314 to change underlying hardware, to change data layout, to change data storage locations, to change database locations, to move data, to move databases, etc., For example, maintenance modules 311 can issue instructions to move a data range for a tenant from one database to another database, can issue instructions to merge data ranges for a tenant at a database, can issue instructions to split a data range for a tenant between a plurality of database, can issue instructions to move a database from one node to another node, etc. Maintenance modules 311 can issue instructions in an automated manner and/or can issue instructions in response to instructions from administrators.

From time to time or at specified intervals, maintenance modules 311 can monitor resource usage at nodes included machines 314 can issue instructions to balance resource usage. For example, if one node is experiencing higher resource usage, a portion of the data ranges and/or databases at the node can be moved to another node with lower resource usage. If maintenance modules 311 detect a node or database failure, maintenance modules 311 can issue instructions to move appropriate data ranges and/or databases to other nodes. Maintenance modules 311 can also issue instructions to lock appropriate data ranges and/or databases so that further data is not stored at failing components.

An administrator can also issue commands to maintenance modules 311. For example, an administrator can send commands to take down a specified node. In response, maintenance modules 311 can issue instructions to move databases at the node to one or more other nodes. Likewise, an administrator can flag a newly added node as available. In response, maintenance modules 311 can issue instructions to move databases from one or more other nodes to the newly available node.

Accordingly, underlying hardware, data layout, data storage locations, database locations, etc. of machines 314 can change overtime. In general, partition map 331 maps data ranges to databases and databases to nodes. For example, as depicted, partition map 331 includes data range map 332 and database map 333.

On a per tenant basis, data elements in data range map 332 map data ranges for the tenant to a corresponding databases. As depicted, data range map 332 includes data ranges to databases mappings for tenants 302 and 303. Similar data range maps for any other tenants 301 can also be included in data range map 332. Database map 333 maps databases to corresponding nodes.

In general, monitor and notification module 312 is configured to update partition map 331 as changes at machines 314 are detected. From time to time or at specified intervals, monitor and notification module 312 can poll machines 314 to determine a configuration. In some embodiments, components of machines 314 notify monitor and notification module 312 when a change occurs. For example, a node can notify monitor and notification module 312 when a database is added to or removed from the node. Similarly, a database server can notify monitor and notification module 312 when a data range is added to or removed from a database maintained by the database server.

In response to detected changes and/or notifications, monitor and notification module 312 can update partition map 331 as appropriate to indicate more recent configurations at machines 314. Monitor and notification module 1312 can add, delete, change, modify, etc., mappings in data range map 332 and/or database map 333. For example, monitor and notification module 312 can delete one data range to database mapping and add two new data range to database mappings when a data range is split. On the other hand, monitor and notification module 312 can delete two data range to database mappings and add one new data range to database mapping when two data ranges are merged. Monitor and notification module 312 can also remove, add, and modify database to node mappings as movement of database between nodes is detected.

Virtualization layer 307 further includes scheduler 308, assignment module 309, and resource management module 381. Assignment module 309 is configured to receive import data from a tenant and move the portions of the import data (e.g., rows) into appropriate buckets 341. Based on a data value (e.g., a primary key value) in a portion of data (e.g., a row) from a tenant, assignment module 109 can refer to a data range map 332 for the tenant. From the data range map 332, assignment module 309 can determine what data range includes the data value. Assignment module 309 can then refer to the corresponding database for that data range. Assignment module 309 can then move the portion of import data to a bucket for the corresponding database.

Buckets 341 are configured to accumulate data until a specified condition is satisfied. Buckets 341 can be configured to have a specified size, such as, for example, bucket size 319. Specified conditions can include a bucket becoming full (i.e., the bucket containing data equal to or approaching the specified size) or expiration of a recurring time period.

Scheduler 308 is configured to enqueue buckets into appropriate queues and schedule queues for processing. As such, when a specified condition is satisfied for a bucket, scheduler 308 can enqueue the bucket in a queue for a node where the database is maintained. Each node can have a queue. For example, nodes 314A, and 314B have queues 317A and 317B respectively. Data can be dequeued from the queue in a specified manner for storage in the corresponding database. In some embodiments, each node has one or more threads that process the queue for the node. Scheduler 308 can schedule the one or more threads to dequeue data from the queue and store dequeued data in the corresponding database at the node.

In some embodiments, scheduler 308 enqueues data when either a bucket becomes full or a recurring time period expires. As such, buckets for more sparsely populated data ranges can still be processed with some regularity. Use of a recurring time period can help insure that data for more sparsely populated data ranges is imported even when a corresponding bucket would take longer than the recurring time period to fill.

Resource management module 381 is configured to monitor resource consumption patterns of tenant data imports for tenants of dynamic distributed database 306. Monitoring tenant data imports can include, for each tenant, monitoring the aggregate resource consumption for any data imports being performed for the tenant. As such, resource manager module 381 can determine when an amount of resources being consumed for a tenant's imports are potentially degrading the data import experience for other tenants. For example, resource manager module 381 can determine when a particular tenant is hogging bandwidth such that other tenant's data imports are slow or not possible.

Resource management module 381 can include algorithms to calculate aggregate resource consumption for tenants of dynamic distributed database 106. Resource management module 381 can include algorithms for detecting when resource consumption by one tenant is potentially degrading the import experience of one or more other tenants. Resource consumption thresholds can be used to detect when resource consumption by one tenant is potentially degrading the import experience of one or more other tenants. Resource management module 381 can also include algorithms defining actions that can be taken when the resource consumption of one tenant potentially degrades the import experience of one or more other tenants.

In some embodiments, the algorithms of resource management module 381 are supplemented or even supplanted by import policy 318. Import policy 318 can include rules for calculating aggregate resource consumption, rules for detecting when resource consumption by one tenant is potentially degrading the import experience of one or more other tenants, and rules defining actions that can be taken when the resource consumption of one tenant potentially degrades the import experience of one or more other tenants.

Defined actions can include suspending (stopping) or throttling (slowing down) import of a tenant's data until at least some data for one or more other tenants is successfully imported. Suspending import of a tenant's data can include suspending the placement of the tenant's data in buckets and/or suspending the processing of the tenant's queued data. Throttling import of a tenant's data can include throttling the placement of the tenant's data in buckets and/or throttling the processing of the tenant's queued data.

Import policy 318 can also define tenant resource thresholds, such as, for example, bucket size 319, bandwidth usage thresholds, memory usage thresholds, etc., for tenants importing data into dynamic distributed database system 306.

Various time indicators, for example, t=0, t=1, t=2, etc., are depicted in the data elements of computer architecture 300. The depicted time indicators are used to indicate the order for an occurrence of events relative to one another within computer architecture 300. Although similarly defined, time indicators in computer architecture 300 are not associated with the time indicators in computer architecture 100. That is, the time indicators are used to indicate that some events occur before or after other events. Within these time indicators lower numbers are defined to occur before higher numbers. For example, "t=1" occurs before "t=2". Similarly, higher numbers are defined to occur after lower numbers. For example, "t=7" occurs after "t=4". However, it is to be understood that the depicted time indicators do not represent any measured passage of time either before, after, or between the depicted time indicators. That is, no specified time measurements or specific time periods are associated with the time indicators.

At t=0, virtualization module 307 can access import data 321 at t=0. Import data 321 is associated with tenant 302 and includes rows 321A and 321B (e.g., rows of database). Each of rows 321A and 321B, have data values, for example, primary key values with in one or more ranges of database for tenant 302. For example, row 321A can include a data value (e.g., primary key value) in data range 334. Assignment module 309 can refer to data range map 332 for tenant 302 to determine that data range 334 maps to database 316A2. Assignment module 309 can refer to database map 333 to determine that database 316A2 is hosted at node 314A. At t=1, assignment module 309 can move row 321 into bucket 342 (a bucket for node 314A).

At t=2, virtualization module 307 can access import data 322. Import data 322 is associated with tenant 303 and includes rows 322A and 322B (e.g., rows of database). Each of rows 322A and 322B, have data values, for example, primary key values with in one or more ranges of database for tenant 303. For example, row 322A can include a data value (e.g., primary key value) in data range 336. Assignment module 309 can refer to data range map 332 for tenant 303 to determine that data range 336 maps to database 316B1. Assignment module 309 can refer to database map 333 to determine that database 316B1 is hosted at node 316A.

Subsequent to accessing import data 322, resource management module 381 can detect that tenant 302 is consuming an aggregate amount of resources that potential degrades the import experience of tenant 303 (as well as other database tenants). In response, resource management module 381 can initiate suspending the import of import data 312.

However, at t=3, bucket 342, containing row 321A, can be queued into queue 317A.

At t=4, resource management module 381 can send suspend command 341 to scheduler 308 and/or assignment module 309. In some embodiments, suspend command 341 suspends both placing portions of import data 321 in buckets and processing queued portions of import data 321. In other embodiments, suspend command 341 suspends placing portions of import data 321 in buckets but processing of queued portions of import data 321 are permitted to continue. In further embodiments, suspend command 341 allows placing portions of import data 321 in buckets to continue but suspends processing of queued portions of import data 321.

As depicted in FIG. 3, suspend command 341 instructs both scheduler 309 to suspend the processing of any portions of import data 321 contained in queues and instructs assignment module 309 to suspend the placement of portions of import data 321 into buckets. Thus, in response to suspend command 341, processing of bucket 342 from queue 317A is suspended and placement of row 321 into a bucket is suspended.

Alternately, at t=4, resource management module 381 can send a throttle command to scheduler 308 and/or assignment module 309. In some embodiments, the throttle command throttles both placing portions of import data 321 in buckets and processing queued portions of import data 321. In other embodiments, the throttle command suspends placing portions of import data 321 in buckets but processing of queued portions of import data 321 are permitted to continue at prior speeds. In further embodiments, the throttle command allows placing portions of import data 321 in buckets to continue at prior speeds but throttles processing of queued portions of import data 321.

At t=5, assignment module 109 can move data portion 322A into bucket 343 (a bucket for node 314B). At t=6, scheduler 308 can move bucket 343 into queue 317B. At t=7, a thread for queue 317B can dequeue and store row 322A in a database 316B1. Thus, row 322A is imported into database 316B1, while processing of import data 321 is suspended.

Subsequently, resource management module 381 can allow processing of import data 321 to resume or can unthrottle processing of import data 321. For example, importing data for one or more other database tenants 301 may complete. As such, additional resources are available. At t=8, a thread for queue 317A can dequeue and store row 321A in database 316A2. At t=9, rows 321B and/or 322B can be moved into bucket 344 and later queue for processing. Resource management module 381 can allow import of import data 321 and 322 in parallel as resource availability permits.

In some embodiments, suspending and throttling an import are used together. For example, importing data for a tenant can be throttled to free up some resources. If importing the data is detected as degrading other tenant experiences when throttled, importing the data can be suspended. Similarly, resuming and unthrottling can be also be used together. For example, when resuming import of data for a tenant (e.g., after having been suspended), importing data can be resumed at a throttled rate. If further resources become available for importing the data, importing the data can be unthrottled.

Accordingly, a resource management module can appropriately suspend, throttle, resume, and unthrottle imports across (a possibly large) plurality of tenants so as to more fairly allocate resources among the plurality of tenants. More fairly allocating resources helps insure that each of the plurality of tenants is provided a consistent import experience.

Embodiments of the invention can also be used to import data into standalone non-federated databases.

Figure 4A:
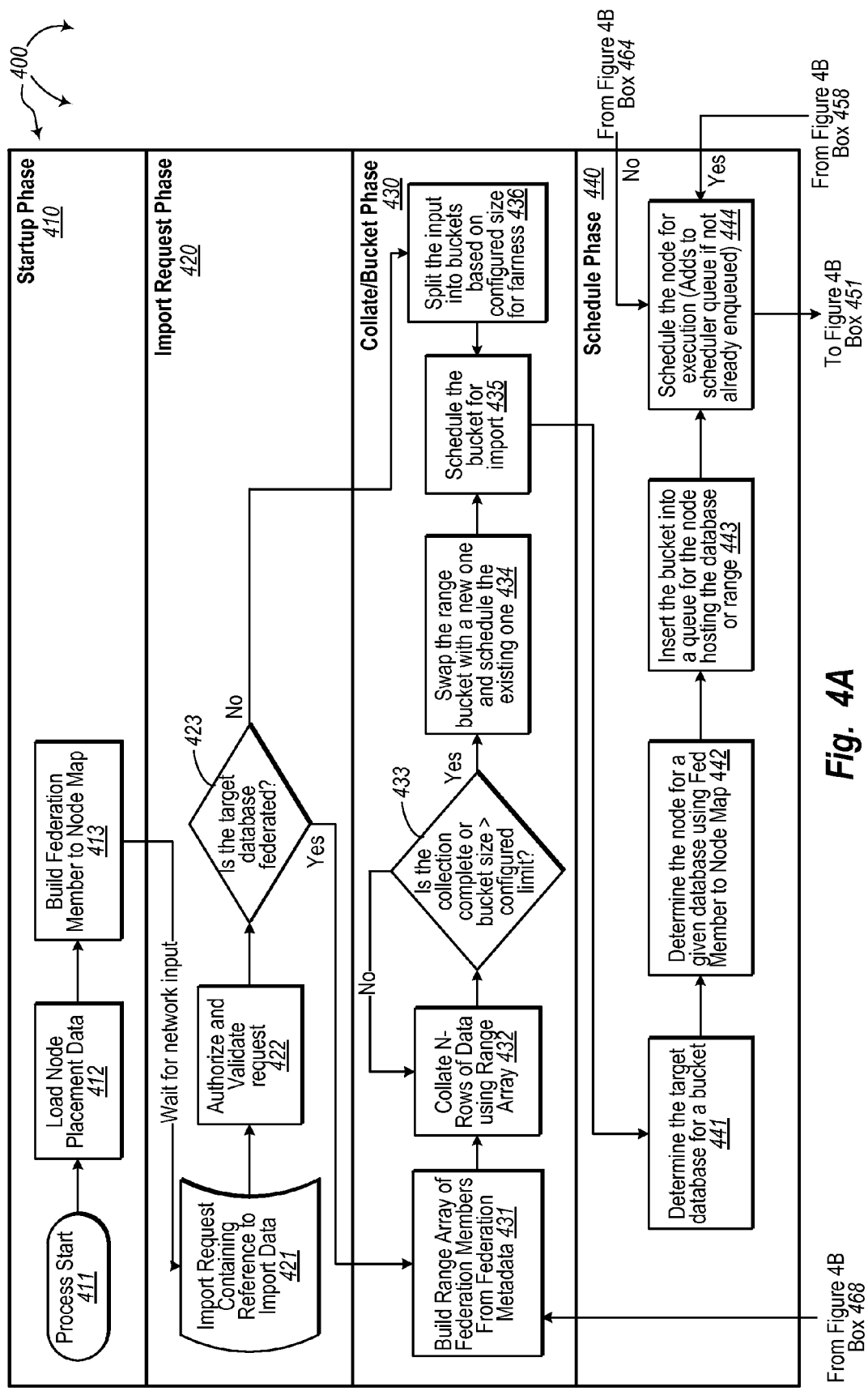
FIGS. 4A and 4B illustrate a more detailed flow chart of an example method for importing data into a dynamic distributed database.
Figure 4B:
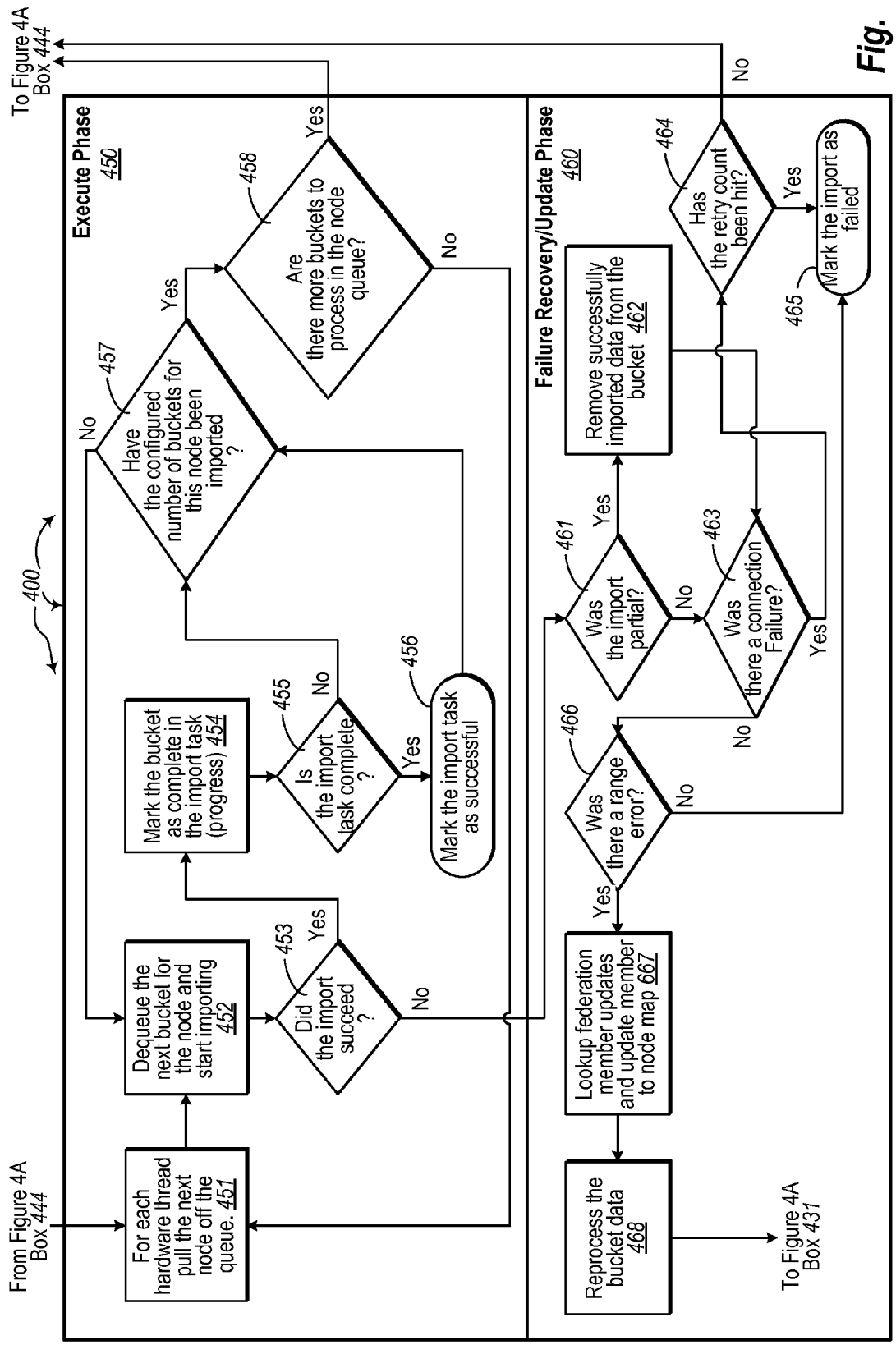

FIG. 4 illustrates a more detailed flow chart of an example method 400 for importing data into a dynamic distributed database.

In startup phase 410, method 400 includes a process start (411). As in startup phase 410, node placement data is loaded (412) and a federation to member node map is built (413). For example, monitor and notification module 112 can build a partition map of a distributed dynamic database (e.g., a cloud database). The dynamic distributed database can then begin to wait for network input.

In import request phase 420, an import request containing reference to import data can be received (421). The request can be authorized and validated (422). It can be determined if the target database is federated (423).

If the database is non-federated (NO at 423), in a collate/bucket phase 430, import data is split into buckets based on configured size for fairness (436). If the database is federated (YES at 423), in a collate/bucket phase 430, a range of arrays of federation members is built from federation metadata (431). Federation metadata can include a partition map. In collate/bucket phase 430, N-rows of data can be collated using the range array (432). In collate/bucket phase 430, it can be determined if import of a collection is complete or if bucket size is greater than a configured limit (e.g., data contained in a bucket is or is approaching a specified size) (433).

When a collection is not complete and a bucket size is not greater than a configured limit (NO at 433), collation continues (432). When collection is complete or a bucket size is greater than a configured limit (YES at 433), the range bucket is swapped with a new one and the range bucket is scheduled for processing (434). In collate/bucket phase 430, the bucket is schedule for import (435). Collate/bucket phase 430 can be performed by virtualization layer 307 (or other similarly configured modules) through reference to a partition map (or other similarly configured data).

In a schedule phase 440, a target database for a bucket can be determined (441). In schedule phase 440, the node for a given database can be determined using a federation member to node map (442). In schedule phase 440, the bucket can be inserted into a queue for a node hosting the database or range (443). In schedule phase 440, the node is scheduled for execution (444). Schedule phase 440 can be performed by assignment module 309 and scheduler 308 (or other similarly configured modules) through reference to a partition map (or other similarly configured data).

In an execute phase 450, for each hardware thread, a next node is pulled off the queue (451). In execute phase 450, a next bucket for the thread is dequeued and import is started (452). In execute phase 450, it is determined if an import succeeded (453). If an import did not succeed (NO at 453), transition is made to a failure/recovery phase 460. If an import did succeed (YES at 453), the bucket is marked as complete in an import task (454).

In execute phase 450, it is determined if an import task is complete (455). If an import is not complete (NO at 455), it is determined if a configured number of buckets for a node have been imported (457). If an import is complete (YES at 455), the import task is marked as successful (456) and then it is determined if a configured number of buckets for a node have been imported (457). If a configured number of buckets for the node have not been imported (NO at 457), a next bucket is dequeued for the node and import is started (452). If a configured number of buckets for the node have not been imported (NO at 457), it is determined if there are buckets to process in the node queue (458). If there are buckets to process in the node queue (YES at 458), the node is scheduled for execution (444). If there are no buckets to process in the node queue (NO at 458), the next node is pulled off the queue (451). Execute phase 450 can be performed by one or more threads under the control of a dynamic distributed database system.

In failure/recovery phase 460, it is determined if an import was partially successful (461). If the import was not partially successful (NO at 461), it is determined if there was a connection failure (463). If the import was partially successful (YES at 461), successfully imported data is removed from the bucket (462) and then it is determined if there was a connection failure (463). If there was a connection failure (YES at 463), it is determined if a retry count has been reached (464). If there was not a connection failure (NO at 463), it is determined if there was a range error (466).

If a retry count has not been reached (NO at 464), the node is scheduled for execution (444). If a retry count has been reached (YES at 464), the import is marked as failed (465). If there was no range error (NO at 466), the import is also marked as failed (465). If there was a range error (YES at 466), federation updates and member to node map updates are looked up (467). Failure/recovery phase 460 includes reprocessing the bucket data (468), including building a range of arrays of federation members is from federation metadata (431). Failure/recovery phase 460 can be performed by assignment module 309 and scheduler 308 (or other similarly configured modules) through reference to a partition map (or other similarly configured data).

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A distributed database system, the distributed database system comprising:
   one or more processors;
   system memory;
   a plurality of nodes;
   a plurality of databases distributed across the plurality of nodes;
   a virtualization module, using the one or more processors, configured to:
      initiate import of a one or more data portions into the distributed database system, the one or more data portions associated with a first tenant of the distributed database system, including for each of the one or more data portions:
         schedule the data portion for insertion into an appropriate database for the first tenant through reference to a partition map for the distributed database system, the appropriate database for the first tenant included in the plurality of databases;

prior to completely importing the one or more data portions, suspend importing of the one or more data portions to free up resources for importing one or more other data portions to the distributed database system, the one or more other data portions associated with a second different tenant of the distributed database system;

subsequent to suspending import of the one or more data portions, initiate import of the one or more other data portions into the distributed database system, including for each of the one or more other data portions:

schedule the other data portion for insertion into an appropriate database for the second tenant through reference to the partition map, the appropriate database for the first tenant included in the plurality of databases.

2. The distributed database system of claim 1, wherein a virtualization module, using the one or more processors, configured to schedule the data portion for insertion into an appropriate database for the first tenant comprises a virtualization module, using the one or more processors, configured to insert the data portion into a bucket for the appropriate database for the first tenant, the bucket configured to accumulate data for a specified data range, a data value in the data portion being within the data range.

3. The distributed database system of claim 2, wherein a virtualization module, using the one or more processors, configured to schedule the data portion for insertion into an appropriate database for the first tenant comprises a virtualization module, using the one or more processors, configured to insert the bucket into a queue, the queue corresponding to a node where the appropriate database for the first tenant is located, the node from among the plurality of nodes.

4. The distributed database system of claim 2, wherein a virtualization module, using the one or more processors, configured to schedule the other data portion for insertion into an appropriate database for the second tenant comprises a virtualization module, using the one or more processors, configured to insert the other data portion into another bucket for the appropriate database for the second tenant, the other bucket configured to accumulate data for a specified other data range, a data value in the other data portion being within the other data range.

5. The distributed database system of claim 4, wherein a virtualization module, using the one or more processors, configured to schedule the other data portion for insertion into an appropriate database for the second tenant comprises a virtualization module, using the one or more processors, configured to insert the other bucket into another queue, the other queue corresponding to another node where the appropriate database for the second tenant is located, the other node from among the plurality of nodes.

6. The distributed database system of claim 1, wherein a virtualization module, using the one or more processors, configured to schedule the data portion for insertion into an appropriate database for the first tenant comprises a virtualization module, using the one or more processors, configured to insert the data portion into a queue, the queue corresponding to a node where the appropriate database for the first tenant is located, the node from among the plurality of nodes.

7. The distributed database system of claim 6, wherein a virtualization module, using the one or more processors, configured to schedule the other data portion for insertion into an appropriate database for the second tenant comprises a virtualization module, using the one or more processors, configured to insert the other data portion into another queue, the other queue corresponding to another node where the appropriate database for the second tenant is located, the other node from among the plurality of nodes.

8. The distributed database system of claim 7, wherein the queue and the other queue are the same queue.

9. The distributed database system of claim 1, further comprising the virtualization module, using the one or more processors, configured to resume importing the one or more data portions into the distributed database system subsequent to importing the one or more other data portions into the distributed database system.

10. The method of claim 1, wherein suspending importing of the one or more data portions comprises suspending import of the one or more data portions in accordance with an import policy, the import policy defining resource usage thresholds for the first tenant and for the second tenant.

11. A method for use at a computer system, the computer system including a processor and system memory, the method for providing a consistent user experience when importing data into databases maintained by a distributed database system, the method comprising:

initiating import of a one or more data portions into the distributed database system, the one or more data portions associated with a first tenant of the distributed database system, including for each of the one or more data portions:

scheduling the data portion for insertion into an appropriate database for the first tenant through reference to a partition map for the distributed database system;

prior to completely importing the one or more data portions, suspending importing of the one or more data portions to free up resources for importing one or more other data portions to the distributed database system, the one or more other data portions associated with a second different tenant of the distributed database system;

subsequent to suspending importing the one or more data portions, initiating import of the one or more other data portions into the distributed database system, including for each of the one or more other data portions:

scheduling the other data portion for insertion into an appropriate database for the second tenant through reference to the partition map.

12. The method of claim 11, wherein scheduling the data portion for insertion into an appropriate database for the first tenant comprises:

inserting the data portion into a bucket for the appropriate database for the first tenant, the bucket configured to accumulate data for a specified data range, a data value in the data portion being within the data range; and inserting the bucket into a queue, the queue corresponding to a node of the distributed database system where the appropriate database for the first tenant is located.

13. The method of claim 12, wherein scheduling the other data portion for insertion into an appropriate database for the second tenant comprises:

inserting the other data portion into another bucket for the appropriate database for the second tenant, the other bucket configured to accumulate data for a specified other data range, a data value in the other data portion being within the other data range; and inserting the other bucket into another queue, the other queue corresponding to a node of the distributed database system where the appropriate database for the second tenant is located.

14. The method of claim 11, wherein scheduling the data portion for insertion into an appropriate database for the first tenant comprises inserting the data portion into a queue, the queue corresponding to a node of the distributed database system where the appropriate database for the first tenant is located; and wherein scheduling the other data portion for insertion into an appropriate database for the second tenant comprises inserting the other data portion into another queue, the other queue corresponding to a node of the distributed database system where the appropriate database for the second tenant is located.

15. The method of claim 14, wherein the queue and the other queue are the same queue.

16. The method of claim 11, further comprising resuming importing the one or more data portions into the distributed database system subsequent to importing the one or more other data portions into the distributed database system.

17. The method of claim 11, wherein suspending importing of the one or more data portions comprises suspending import of the one or more data portions in accordance with an import policy, the import policy defining resource usage thresholds for the first tenant and for the second tenant.

18. A method for use at a computer system, the computer system including a processor and system memory, the method for providing a consistent user experience when importing data into databases maintained by a distributed database system, the method comprising:

initiating import of a one or more data portions into the distributed database system, the one or more data portions associated with a first tenant of the distributed database system, including for each of the one or more data portions:

scheduling the data portion for insertion into an appropriate database for the first tenant through reference to a partition map for the distributed database system;

prior to completely importing the one or more data portions, throttling import of the one or more data portions to free up resources for importing one or more other data portions to the distributed database system, the one or more other data portions associated with a second different tenant of the distributed database system;

subsequent to throttling import the one or more data portions, initiating import of the one or more other data portions into the distributed database system, including for each of the one or more other data portions:

scheduling the other data portion for insertion into an appropriate database for the second tenant through reference to the partition map.

19. The method of claim 18, further comprising unthrottling import of the one or more data portions into the distributed database system subsequent to importing the one or more other data portions into the distributed database system.

20. The method of claim 18, wherein throttling import of the one or more data portions comprises throttling import of the one or more portions of data in accordance with an import policy, the import policy defining resource usage thresholds for the first tenant and for the second tenant.

* * * * *